(No Model.)
G. H. LASAR.
TELEGRAPH TRANSMITTER.
No. 338,757. Patented Mar. 30, 1886.
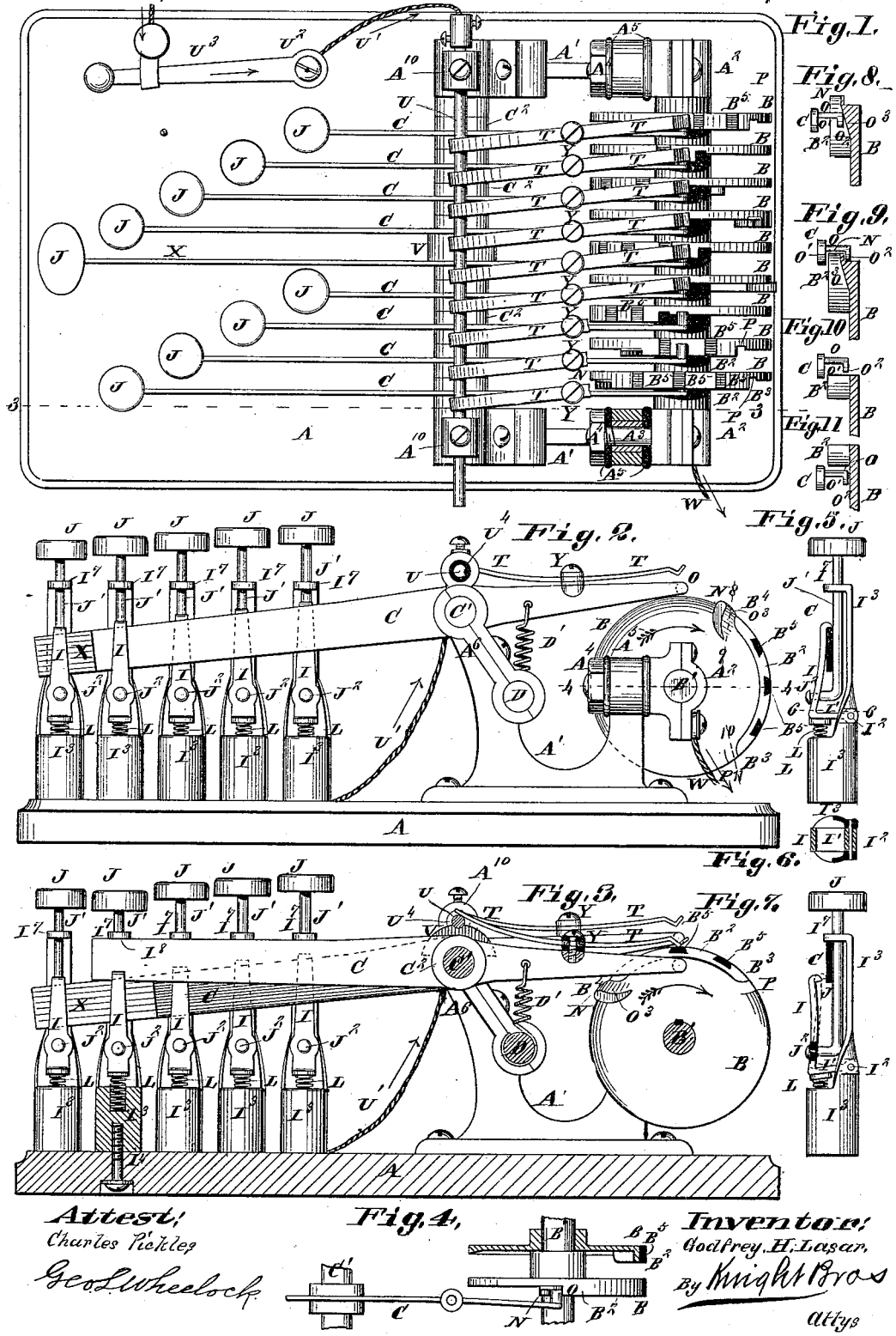
Attest:
Charles Pickles
Geo. L. Wheelock
Inventor:
Godfrey H. Lasar
By Knight Bros
Attys

UNITED STATES PATENT OFFICE.

GODFREY H. LASAR, OF ST. LOUIS, MISSOURI.

TELEGRAPH-TRANSMITTER.

SPECIFICATION forming part of Letters Patent No. 338,757, dated March 30, 1886.

Application filed May 23, 1885. Serial No. 166,476. (No model.)

*To all whom it may concern:*

Be it known that I, GODFREY H. LASAR, of the city of St. Louis, in the State of Missouri, have invented a certain new and useful Improvement in Telegraph-Transmitters, of which the following is a full, clear, and exact description, reference being had to the accompanying drawings, forming part of this specification, and in which—

Figure 1 is a top view of my improved transmitter. Fig. 2 is a side elevation. Fig. 3 is a vertical longitudinal section taken on line 3 3, Fig. 1, showing the instrument in the act of forming a letter, word, or character. Fig. 4 is a section taken on line 4 4, Fig. 2. Fig. 5 is a front view of one of the keys and its stand, showing the hook engaged with its lever. Fig. 7 is a similar view with the hook disengaged from the lever. Fig. 6 is a section taken on line 6 6, Fig. 5. Figs. 8 and 9 are detail sections of one of the disks, taken on line 8 9, Fig. 2, the two figures showing the end of the lever of this disk in different positions. Figs. 10 and 11 are similar views taken on line 10 11, Fig. 2, these figures also showing the ends of the lever in different positions at the receiving end of the flange, Figs. 8 and 9 showing its positions at the releasing end of the flange.

My invention relates to an improved mechanical telegraph-transmitter; and my invention consists in features of novelty hereinafter fully described, and pointed out in the claims.

Referring to the drawings, A represents the base of the instrument, to which is secured brackets or stands A', supporting boxes A², in which is journaled a shaft, B', carrying a number of disks, B, which are rigidly secured thereto. This shaft is turned by any suitable means to cause the disks to revolve. To insure against this shaft binding in its bearings, I secure the boxes A² to the brackets A' by bolts A³ and nuts A⁴, or by other suitable means that will permit them to accommodate themselves to the shaft and always be in line therewith, even should the base become warped, throwing the brackets out of vertical lines; or should the brackets not be plumb from any other cause—as, for instance, owing to irregularities in the surface of the base to which they are secured—the boxes will rock either way, so as to be in line with the shaft. The bolts A³ are insulated from the brackets by rubber or other suitable material, A⁵. (See Fig. 1.) Each disk has a flange, B², with a receiving end, B³, and a releasing-end, B⁴, and on the periphery of the disks over these flanges are formed the telegraphic letters, figures, or characters by means of non-conductors B⁵, dovetailed into or otherwise secured to the disks.

C represents levers supported on a shaft, C', and upon which they rock. They have hubs C², through which the shaft passes, and the shaft has bearing in the upwardly-projecting ends A⁶ of the bracket A'.

D is a rod that is also supported by the brackets A', and to which each lever is connected by a spring, D', the office of which is to pull the inner end of the lever down upon its disk when its outer end is released, which is held down by a vertical dog, I, with a horizontal part, I', pivoted at I² to a stand, I³, connected to the base A by a screw, I⁴, (see Fig. 3,) or by other suitable means. Each lever is provided with this dog arrangement, and to release the levers the dogs are forced from the position shown in Fig. 5 to that shown in Fig. 7 by finger-keys J, having stems J', that pass down through inturned ends of the stands I³, and are connected at J² to the dogs. As soon as the key is pressed down the lever thus released is operated by its spring D', as described, and as soon as the key is released a spring, L, throws the dog back against the key, as shown by dotted lines, Fig. 7, when it is ready to engage over and hold the lever down when the letter, figure, or character is completed, this end of the lever being forced down, when the letter, &c., is completed, by a cam-projection, N, protruding from the surface of the periphery of the disk at the releasing end of the flange. This cam raises the inner end of the lever, forcing its outer end down to be engaged by the dog, as described, so that the lever will be held off the disk until its key is again operated; and to prevent the pin O on the end of the lever that engages under the flange on the disk being touched by the cam before this lever is again operated I notch out the pin as shown at O', for the passage of the cam, and in order that the end O² of the pin which is not cut away will not come against the cam, I provide the disk with an incline, O³, over which the cam is located, and against which the end of the pin bears (see Fig. 8) as the pin is leaving the flange. This causes the end of the key to be forced to one side, (see Fig. 4,) and as soon as the pin leaves the incline this end of the lever springs back to its natural position, and will slightly fall, too, for the end O² of the pin at this time leaves the cam. The next time the cam comes around it will pass through the notch in the pin, as shown in Fig. 9. The disk is notched out slightly at P to cause the pin (I am only describing one set, they are all alike) to enter under the flange when the key has been operated and the flange comes around. The cam N extends down the inner face of the disk slightly, (see Figs. 2 and 3,) to cause the lever to move out as soon as the releasing end of the flange is reached. When the pin is under the flange, the end of a brush, T, consisting preferably of spring metal, bears against the letter, figure, or character, (see Fig. 3,) transmitting this letter, figure, or character through it to a wire or rod, U, against which its other end bears and with which a wire, U', is connected that comes from a post, U², of an ordinary circuit, connecter, U³. The wire or rod U is supported on extensions A¹⁰ of the brackets A', from which it is insulated by rubber or other suitable material, U⁴.

To keep the wire or rod from sagging under the pressure of the spring, I place a support or supports, V, between it and the hubs of the levers, (see Figs. 1 and 3,) which is made of rubber or other non-conductor.

Instead of the electricity passing in the direction stated, it may pass in the opposite direction, as shown by the featherless arrows, and from the brushes it passes through the disks, the shaft of the disks and a wire, W, to the receiver. The brushes are connected to the levers by screws Y, or other suitable means, from which they are insulated, as shown in Fig. 3. As soon as the pin moves from under the flange of the disk the spring or brush is lifted out of contact with the disk and flanges, and is held out of contact until the pin enters beneath the flange again. If a lever should be operated just after the receiving end of the flange had passed the pin or end of the lever, the pin would drop onto the periphery of the disk, but the brush would not, and the cam N would pass through the notch in the pin, as shown in Fig. 9, thereby not raising the lever, so that its key would have to be struck again, but leaving it in position for the pin to engage beneath the flange the next time it comes around.

X represents the spacer-key, which I prefer to place in the center.

To prevent the levers being pulled down too far by the springs D' when the letter, figure, or character is being formed, I so arrrange them that their outer ends will come against the inturned ends I⁷ of the stands I, (see Fig. 3 at I⁸,) or they may come against other suitable stops provided for them. The lower ends of the stems of the keys being bent out and connected to the dogs, they are thus prevented from turning, so that the letters on the finger-pieces or buttons of the keys are always kept in the proper position and not allowed to turn.

I am aware that it is not new to form a way or groove in a disk and place letters, figures, or characters on the periphery of the disk over the way or groove, as shown in the application of George W. Baldridge, filed December 26, 1884, No. 151,221; and I do not make any claim as inventor of the device shown and described in that application; but What I do claim, and desire to secure by Letters Patent, is—

1. In a telegraph-transmitter, in combination with the disks provided with letters, figures, or characters, spring-levers carrying brushes to bear against said letters, figures, or characters, and the inclines on the lateral faces of the disks, and cams rigid on the disks to throw and keep the levers out of contact therewith, substantially as set forth.

2. In a telegraph-transmitter, the flanged revolving disks provided with letters, figures, or characters over the flanges, in combination with the spring-levers, notched pins on the levers to engage beneath said flanges, inclines and cams on the disks to throw and keep the pins out of contact with the disks until the levers are operated again, and the brushes on the levers for coming against said letters, figures, or characters, substantially as set forth.

3. In a telegraph-transmitter, the flanged revolving disks having notches at the receiving end of the flanges, and figures, letters, or characters over the flanges, in combination with the spring-levers, notched pins on the levers to engage beneath said flanges, incline and cams at the releasing ends of the flanges to throw and keep the pins out of contact with the disks until the levers are operated again, keys and springs for operating the levers, and brushes for bearing against said letters, figures, or characters, substantially as set forth.

4. In a telegraph-transmitter, the revolving disks, levers carrying brushes to bear against letters, figures, or characters on said disks and projecting beneath the finger-keys at their forward ends, spring-dogs at the forward end of said levers for retaining them when depressed, and keys for releasing said levers and permitting their inner ends to be pulled down by suitable springs, substantially as and for the purpose set forth.

5. In a telegraph-transmitter, the revolving disks, levers carrying brushes to bear against letters, figures, or characters on said disks, springs to force the levers down when released, dogs engaging with the levers to hold their inner ends up, springs beneath the dogs, and finger-keys connected to the dogs for operating them, the dogs being pivoted to stands that give support to the keys, substantially as set forth.

6. In a telegraph-transmitter, the combination of revolving disks provided with letters, figures, or characters, levers and brushes for bearing on said disks, springs for forcing the inner ends of the levers down, dogs for engaging the outer end of the levers to hold their inner ends up, keys for releasing the dogs, and cams on the disks for engaging the levers with the dogs when the letters, figures, or characters are completed, substantially as set forth.

7. In a telegraph-transmitter, in combination with revolving disks provided with letters, figures, or characters, a cam and an incline on the lateral face of said disk and a lever carrying a contact-brush, said brush being adapted to contact with said disk and said lever adapted to be thrown both radially and laterally of said disk by said cam and incline and then to spring back to normal position, substantially as set forth.

8. In a telegraph-transmitter, the revolving disks provided with letters, figures, or characters, mechanism for coming in contact with the disks to close the circuit, shaft on which said disks are supported, and pivoted journal-boxes giving bearing to the shaft, substantially as and for the purpose set forth.

9. In a telegraph-transmitter, the combination of the base A, brackets A', pivoted boxes A², connected to the brackets by bolts and nuts, shaft journaled in said boxes, disks on the shaft provided with letters, figures, or characters, and mechanism for coming against the disks to close the circuit, substantially as and for the purpose set forth.

10. In a telegraph-transmitter, the combination of disks B, provided with letters, figures, or characters, levers C, springs D', brushes T, connected to the levers by screws Y, wire or rod U, and keys for releasing the levers, substantially as and for the purpose set forth.

11. In a telegraph-transmitter, the combination of the revolving disks B, provided with letters, figures, or characters and with flanges B², notches P, incline O³, and cam N, levers C, provided with pins O, having notches O', brushes T on the levers, springs D', pivoted dogs I, springs L, stands I³, and keys J J', substantially as and for the purpose set forth.

12. In a telegraph-transmitter, the disks provided with letters, figures, or characters and with flanges B², notches P, incline O³, and cams N, in combination with the brush-carrying levers provided with notched pins O, the pins and levers being forced to one side by the inclines O³ and being raised by the cams N, and then the levers resuming their natural position to permit the cams N to pass through the notches in the pins, as shown and described.

13. In a telegraph-transmitter, the disks provided with letters, figures, or characters, in combination with the brush-carrying levers, springs for forcing the levers down against the disks, and stops to prevent the levers being forced down too far by the springs, substantially as set forth.

14. In a telegraph-transmitter, the disks provided with letters, figures, or characters, in combination with the brush-carrying levers, springs for forcing the inner ends of the levers down against the disks, and the posts I, with inturned ends I', to form stops for the levers, to prevent their inner ends being pulled down too far by the said springs, substantially as set forth.

GODFREY H. LASAR.

In presence of—
   GEO. H. KNIGHT,
   SAML. KNIGHT.